United States Patent
Cherubini et al.

(10) Patent No.: US 10,102,649 B2
(45) Date of Patent: Oct. 16, 2018

(54) ITERATIVE IMAGE SUBSET PROCESSING FOR IMAGE RECONSTRUCTION

(71) Applicant: International Business Machines Corporation, Armonk, NY (US)

(72) Inventors: Giovanni Cherubini, Rueschlikon (CH); Paul Hurley, Rueschlikon (CH); Sanaz Kazemi, Rueschlikon (CH); Matthieu Simeoni, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 14/878,886

(22) Filed: Oct. 8, 2015

(65) Prior Publication Data
US 2017/0103549 A1   Apr. 13, 2017

(51) Int. Cl.
G06T 11/00    (2006.01)

(52) U.S. Cl.
CPC ....... G06T 11/003 (2013.01); *G06T 2211/424* (2013.01)

(58) Field of Classification Search
CPC .................. G06T 11/003; G06T 2211/424
See application file for complete search history.

(56) References Cited

U.S. PATENT DOCUMENTS

| | | | |
|---|---|---|---|
| 6,719,696 B2 | 4/2004 | Stergiopoulos et al. | |
| 7,085,405 B1 * | 8/2006 | Levkovitz | G06T 11/006 250/264 |
| 8,761,477 B2 | 6/2014 | Walker et al. | |
| 8,818,064 B2 | 8/2014 | Walker et al. | |

(Continued)

OTHER PUBLICATIONS

Zhou et al., "Compressed Digital Beamformer with asynchronous sampling for ultrasound imaging", 2013 IEEE International Conference on Acoustics, Speech and Signal Processing (ICASSP), Vancouver, BC, May 26-31, 2013, pp. 1056-1606; http://ieeexplore.ieee.org/xpl/login.jsp?tp=&arnumber=6637811&url=http%3A%2F%2Fieeexplore.ieee.org%2Fxpls%2Fabs_all.jsp%3Farnumber%3D6637811.

(Continued)

*Primary Examiner* — Daniel Pihulic
(74) *Attorney, Agent, or Firm* — Scully, Scott, Murphy & Presser, P.C.; Daniel P. Morris, Esq.

(57) ABSTRACT

The present invention is notably directed to computer-implemented methods and systems for recovering an image. Present methods comprise: accessing signal data representing signals; identifying subsets of points arranged so as to span a region of interest as current subsets of points; reconstructing an image based on current subsets of points, by combining signal data associated to the current subsets of points; detecting one or more signal features in a last image reconstructed; for each of the detected one or more signal features, modifying one or more subsets of the current subsets, so as to increase, for each of the modified one or more subsets, a relative number of points at a location of said each of the detected one or more signal features. The relative number of points of a given subset at a given location may be defined as the number of points of said given subset at the given location divided by the total number of points of said given subset, whereby new current subsets of points are obtained; and repeating the above steps of reconstructing, detecting and modifying, as necessary to obtain a reconstructed image that satisfies a given condition.

25 Claims, 8 Drawing Sheets

(56) References Cited

U.S. PATENT DOCUMENTS 9,033,884 B2     5/2015   Rothbert et al.
9,801,591 B2*   10/2017   Holmes .................. A61B 6/032
2013/0204114 A1    8/2013   Huang et al.
2017/0103549 A1*   4/2017   Cherubini ............. G06T 11/003

OTHER PUBLICATIONS

Basarab et al., "Medical ultrasound image reconstruction using distributed compressive sampling", 2013 IEEE 10th International Symposium on Biomedical Imaging (ISBI); San Francisco, CA, Apr. 7-11, 2013, pp. 628-631; http://ieeexplore.ieee.org/xpl/login.jsp?tp=&arnumber=6556553&url=http%3A%2F%2Fieeexplore.ieee.org%2Fxpls%2Fabs_all.jsp%3Farnumber%3D6556553.

Vogel et al., "Efficient Parallel Beamforming for 3D Ultrasound Imaging", GLSVLSI'14 Proceedings of the 24th edition of the Great Lakes Symposium on VLSI, May 21-23, 2014, Houston, TX, pp. 175-180; http://dl.acm.org/citation.cfm?id=2591599.

* cited by examiner

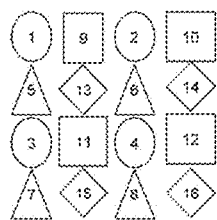
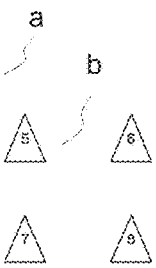 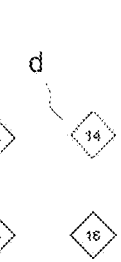 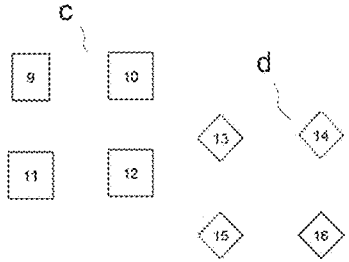
FIG. 6　　FIG. 6a　FIG. 6b　FIG. 6c　FIG. 6d
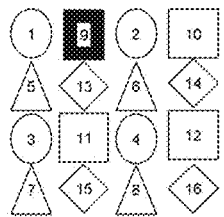
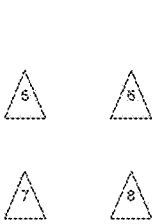 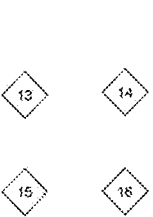 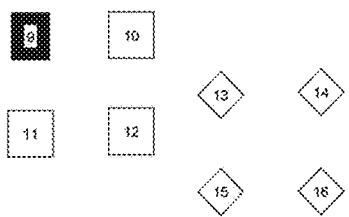
FIG. 7　　FIG. 7a　FIG. 7b　FIG. 7c　FIG. 7d
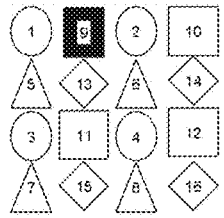
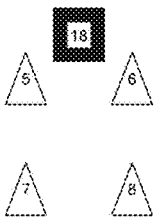 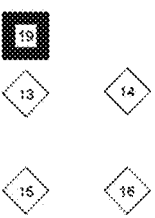 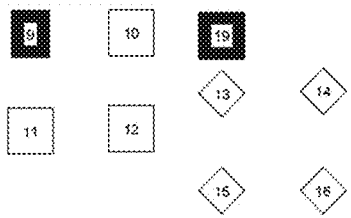
FIG. 8　　FIG. 8a　FIG. 8b　FIG. 8c　FIG. 8d
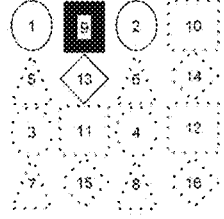
  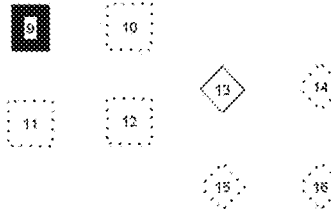
FIG. 9　　FIG. 9a　FIG. 9b　FIG. 9c　FIG. 9d

ITERATIVE IMAGE SUBSET PROCESSING FOR IMAGE RECONSTRUCTION

FIELD

The invention relates in general to the field of computerized methods and systems for image reconstruction, in particular in the fields of radio interferometry (to recover a sky image), magnetic resonance imaging or ultrasound imaging, and methods to simplify and improve the performances of such computerized methods and systems for image reconstruction.

BACKGROUND

Image reconstruction from signals received by sensor arrays is used in many application fields, including radio interferometry, e.g., for astronomical investigations, magnetic resonance imaging, ultrasound imaging and positron emission tomography for medical applications. Iterative reconstruction typically refers to algorithms used to reconstruct 2D and 3D images. Often, iterative reconstruction techniques provide better results but are computationally more expensive.

SUMMARY

According to a first aspect, the present invention is embodied as computer-implemented methods for recovering an image. Such methods revolve around the following steps, each implemented via one or more processors. First, signal data that represent signals are accessed. Subsets of points, arranged so as to span a region of interest, are identified as current subsets of points. Then, an image is reconstructed, based on current subsets of points, by combining signal data associated to the current subsets of points. One or more signal features are detected in a last image reconstructed. Next, and for each of the one or more signal features detected, one or more subsets (of the current subsets of points) are modified, so as to change a number of points of said one or more subsets, according to a location of said each of the one or more signal features detected. Eventually, new subsets of points are obtained, which will be used as current subsets, when repeating the above steps of reconstructing, detecting and modifying. These steps are repeated as necessary to obtain a reconstructed image that satisfies a given condition.

A remarkable advantage of the present methods is that the signal features are progressively introduced and refined while iteratively modifying the subsets of points, by changing, at each iteration, the number of points in subsets based on locations of the detected signal features.

Considering subsets of points as defined above, together with iteratively modifying them, allows to achieve high accuracy while having reasonably low computational requirements, especially when compared to imaging methods using gridding and discrete Fourier transforms.

The subsets of points may for instance be modified, so as to increase (for each of the modified subsets), a relative number of points at a location of each of the detected features. The relative number of points of a given subset at a given location is defined as the number of points of said given subset at the given location divided by the total number of points of said given subset.

In preferred embodiments, the modification comprises adding points to one or more of the current subsets of points. In variants, one may instead progressively subtract points (e.g., points that are far from the locations of the detected features) from subsets and iterate the process as long as the subsequently reconstructed image still satisfies a pre-determined criterion or condition. In both cases, the relative number of points increases at the location of a detected feature, throughout the iterations, and for each of the modified subsets. The optimal approach depends on the criteria or conditions chosen. From the viewpoint of the achieved accuracy in the image reconstruction, it is, however, preferred to progressively increase the (whole) number of points per subset.

According to another aspect, the invention is embodied as a system for recovering an image from signal data. The system comprises one or more processing units and a memory comprising computerized methods, the latter configured, upon execution by the one or more processing units, for implementing steps of the above methods for recovering an image.

According to a final aspect, the invention is embodied as a computer program product, which comprises a computer readable storage medium having program instructions embodied therewith, the program instructions executable by a computerized system, such as the above system, to cause to the steps of present image recovery methods.

Systems, computer program products and methods embodying the present invention will now be described, by way of non-limiting examples, and in reference to the accompanying drawings.

BRIEF DESCRIPTION OF SEVERAL VIEWS OF THE DRAWINGS

FIGS. 5-9*d* are simplified representations of points and subsets of points, illustrating how subsets can be iteratively modified to increase a relative number of points at a location of a detected feature, as involved in embodiments. FIG. 9-9*d* illustrate a variant to the embodiment of FIG. 7-8*d;*

FIG. 10 illustrates an intensity distribution in a field of view in absence of noise; FIG. 10*a-c* show images as obtained after successive iterations, while FIG. 10*d* depicts a superposition of a target sky image and an image as obtained after a $3^{rd}$ iteration, according to embodiments;

DETAILED DESCRIPTION OF EMBODIMENTS

The following description is structured as follows. First, general embodiments and high-level variants are described (sect. 1). Then, more specific embodiments and technical implementation details are addressed (sect. 2 and 3).

1. General Embodiments and High-Level Variants

Figure 1:
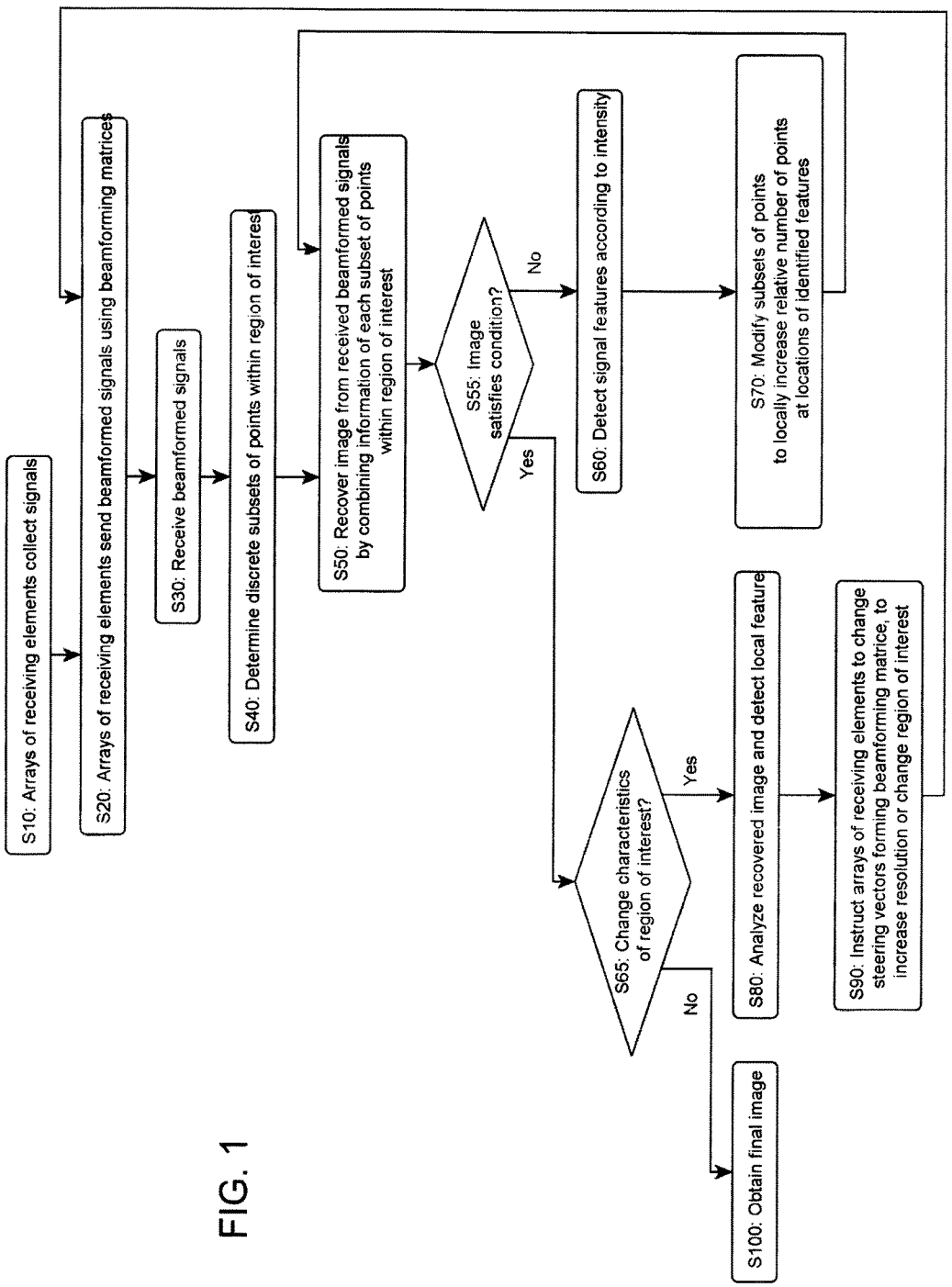
FIG. 1 is a flowchart illustrating high-level steps of a method for recovering an image, according to embodiments of the invention.

In reference to FIG. 1, an aspect of the invention is first described, which concerns computer-implemented methods for recovering an image. Such methods basically rely on the following steps, which are, each, implemented via one or more processors of a computerized system.

First, signal data that represent signals are accessed, step S30 in FIG. 1. Second, subsets of points, arranged so as to span a region of interest, are identified S40 as current subsets of points. Note, however, that step S40 can be performed prior, or in parallel, to step S30. Then, an image is reconstructed S50, based on current subsets of points, by combining signal data associated to the current subsets of points. One or more signal features can then be detected S60, in a last image reconstructed. This detection is preferably fully automated, although it could involve inputs from a user.

Next, and for each detected signal feature, one or more subsets (of the current subsets) are modified S70, so as to change a number of points of the one or more subsets, i.e., to change a number of points in these subsets, and this, according to a location of said each signal feature detected.

To that aim, one may for instance increase a relative number of points at a location corresponding to of each of the detected features and this, in each of the one or more subsets. The relative number of points of a given subset at a given location is defined as the number of points of said given subset at the given location, and divided by the total number of points of said given subset. This way, new subsets of points are obtained, which will be used as current subsets, when repeating the above steps of reconstructing, detecting and modifying. These steps are repeated as necessary to obtain a reconstructed image that satisfies a given condition.

In other words, recovering the image is carried out by combining information obtained for each subset of points within a region of interest. As the process decomposes into sub-processes which operate, each, at a subset level, the overall complexity is substantially reduced. Indeed, the computational effort to reconstruct an image increases more than linearly with the number of points. Intermediate image reconstruction steps are preferably carried out using approximate message passing methods in a bipartite factor graph, which are described in sect. 2. However, any image reconstruction can be contemplated at such steps.

A remarkable advantage of the present methods is that the signal features are progressively introduced and refined while iteratively modifying the subsets of points, by changing, at each iteration, the number of points in subsets based on locations of the detected signal features.

As said earlier, one may progressively increase a relative number of points in the subsets. More preferably, one may simply progressively increase the whole number of points in each modified subset (as illustrated in FIGS. 6-8d). I.e., in such embodiments, points are added to some of the current subsets.

Increasing the whole number of points at a location of a detected feature is one way to increase the relative number of points. In variants (FIGS. 6 and 9-9d), one may progressively subtract points (e.g., points that are far from the locations of the detected features) from subsets and iterate the process as long as the subsequently reconstructed image still satisfies a pre-determined criterion or condition. In both cases, the relative number of points increases at the location of a detected feature, throughout the iterations, and for each of the modified subsets. The optimal approach depends on the criteria or conditions chosen. From the viewpoint of the achieved accuracy in the image reconstruction, it is, however, preferred to progressively increase the (whole) number of points per subset.

In more sophisticated embodiments, one may, at a given iteration, selectively increase a number of points in some of the subsets, and selectively decrease a number of points in other subsets. In still other embodiments, one may selectively increase a number of points at a given iteration and selectively decrease a number of points in other subsets at a subsequent iteration. In all cases, the number of points is modified at each iteration, so as to iteratively refine the signal features.

More generally, embodiments described below have the following advantages:
They provide higher accuracy and lower computational requirements over imaging methods such as based on gridding and discrete Fourier transforms;
They further enable imaging also for fast time-varying phenomena; and
Finally, and where beamforming techniques are involved, embodiments described below make it possible to modify beamforming and image resolution based on information obtained at the end of a set of iterations.

Figure 5:
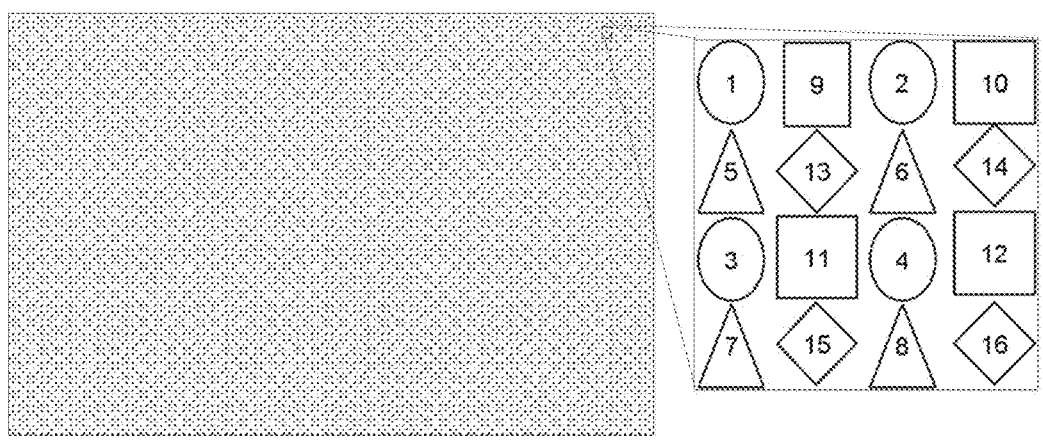

As evoked above, the present methods preferably progressively increases the number of points in each of the modified subsets. This first class of embodiments is now described in reference to FIGS. 1, and 5-8d. As said, points are in this case progressively added S70 to one or more of the current subsets of points. The points added correspond to locations of features that were detected during the previous step S60. This is illustrated using a simplified example of a 4×4 matrix of points (FIG. 6), e.g., extracted from a region of interest (FIG. 5) which in practice shall likely involve a much larger number of points.

In FIG. 6, each subset of points is represented using distinct geometric figures, i.e., circles, triangles, rectangles and diamonds, corresponding to subsets a, b, c and d, which are otherwise separately depicted in FIGS. 6a, 6b, 6c and 6d, respectively. Note that, initially, the subsets a, b, c and d preferably form disjoint subsets, which altogether span the region of interest. None of the points overlap, i.e., the points of all subsets match distinct points of said region and the subsets are initially identical under translation, as illustrated in FIGS. 6a-6d. This way, the initial definition of the subsets and the subsequent processing are made simpler.

FIG. 7 illustrates the same subsets after having detected one particular signal feature in the last image reconstructed (step S60 in FIG. 1). There, a given point (point 9) was found to correspond to the identified signal feature, which point is identified in FIG. 7c by a blackened rectangle. The detection S60 of signal features is typically performed by scanning the current subsets of points. The detection may simply consists of selecting one or more signal intensities that exceed, each, an intensity threshold. The latter may be modified at each iteration, to refine detection, if necessary.

Then, the subsets are modified S70 so as to add one point to the remaining subsets a, b and d, as shown in FIGS. 8-8d. More generally, present methods shall, in embodiments, and for a given detected signal feature, identify one point of a given subset, which corresponds to said given detected feature, and add one point to each of the remaining n−1 subsets, where the added point corresponds to the location of said given detected signal feature. Still, there is no need to add points to subsets that correspond to locations for which a point was already added, so that at most one point shall be added to each subset, at each iteration. The same can be performed for each detected feature. And this process can be repeated, as necessary for an image eventually reconstructed to match a given criterion.

Adding a point in a subset, which corresponds to a location for which no point was previously assigned (as for instance the case in each of FIGS. 8a, b and d), results in increasing a relative number of points at said location and this, for each modified subset. Indeed, consider the example of FIG. 8a vs. FIG. 7a. Here, point 17 was added S70 to subset a, in correspondence with the location of a previously detected signal feature S60. In other words, the number of points at this location passed from 0 (FIG. 7a) to 1 (FIG. 8a). Consistently, the value of the discrete distribution of points corresponding to subset a has increased at this location. At the same time, the total number of points in subset a passed from 4 (FIG. 7a) to 5 (FIG. 8a). Accordingly, the relative number of points at this precise location passed from 0/4=0 (FIG. 7a) to 1/5=0.2 (FIG. 8a), so that the relative number of points has increased at this location. As one furthermore realizes when comparing FIGS. 7a and 8a, the areal (number) density of point has increased as well.

The same process S50-S70, as described above, can be performed for each previously detected features (subject to overlaps) and repeated, i.e., iterated, until the subsequently reconstructed image satisfies a given condition, S55. At each iteration, the intensity threshold may be changed with respect to a previous iteration.

Note that it is algorithmically simpler to consider initially n disjoint (but otherwise identical) subsets and to add, for each detected feature, a point to the n−1 subsets. However, variants can be contemplated where non-identical subsets are initially identified (which may possibly overlap) and wherein, independently, points are added to a restricted number of subsets, e.g., to the sole subsets neighboring an identified signal feature. Still, subsets of points would be modified by adding at most one point thereto.

At present, another class of embodiments is now described in reference to FIGS. 9-9d. Again, one assumes that, initially, the subsets a, b, c and d form disjoint subsets, which altogether span the region of interest, as illustrated in FIGS. 6a-6d. As in the previous class of embodiments, one particular signal feature is assumed to be detected in a last reconstructed image, as illustrated in FIGS. 7-7d, see the blackened rectangle (point 9) of FIG. 7c. However, the subsets are now modified S70 so as to subtract points therefrom, as illustrated in FIGS. 9-9d. In this case, each point that does not correspond to an identified feature may be considered for removal. However, finer strategies may be adopted, e.g., keep points corresponding to the m first neighbors of points that correspond to detected features. In the pedagogical example of FIG. 9-9d, point 9 and its first neighbors (points 1, 2 and 13) were kept, whereas other points where removed. The same can be performed for each detected feature, whereby only points in the vicinity of detected signal features are kept. And this process can be repeated, as necessary for a subsequently reconstructed image to match a given criterion (or, equivalently, as long it satisfies a given condition).

Subtracting a point from a subset (as for instance the case in each of FIGS. 9a, b and d), also results in increasing a relative number of points at a feature location. Indeed, consider the example of FIG. 9c vs. FIG. 7c. Here, points 10, 11 and 12 were removed S70, in correspondence with the location of a previously detected signal feature (point 9), S60. In other words, the number of points at this location remained constant and equal to 1 (be it in FIG. 7c or 9c). But at the same time, the total number of points in subset c passed from 4 to 1. Accordingly, the relative number of points at this precise location passed from 1/4=0.25 to 1/1=1, so that the relative number of points has increased at this location.

Note that both classes of embodiments (addition/subtraction of points) can be intermingled, in still other embodiments. I.e., it might be desired to re-introduce points after having removed some, and conversely. In all cases, it is possible to modify S65 the characteristics of the region of interest at the end of a set of iterations S50-S70.

Present methods are advantageously used for processing beamformed signals. Referring back to FIG. 1, the signal data accessed at step S30 may be beamformed signal data representing beamformed signals, i.e., signals that have been generated S20 using beamforming matrices (formed by sensor steering vectors), from signals collected S10 by arrays of elements, as known per se from beamforming techniques. It is nevertheless possible to modify beamforming parameters and image resolution based on information obtained at the end of a set of iterations S50-S70, see step S65 in FIG. 1. This allows to change characteristics of the region of interest.

To that aim, the last reconstructed image may be analyzed S80, to detect one or more signal features therein. Then, based on an outcome of this analysis, the sensor steering vectors, which in embodiments determine the matrices used for beamforming, may be instructed S90 to be changed, so as to generate new beamformed signal data, S30. After that, another set of iterations S50-S70 can be performed, as necessary for a subsequently reconstructed image to satisfy S100 a given condition, which condition may have changed with respect to the previous set of iterations.

In embodiments, the sensor steering vectors may notably be changed S90 to generate new beamformed signal data that correspond to, e.g., a modified size of the region of interest and/or a modified resolution of this region.

Figure 2:
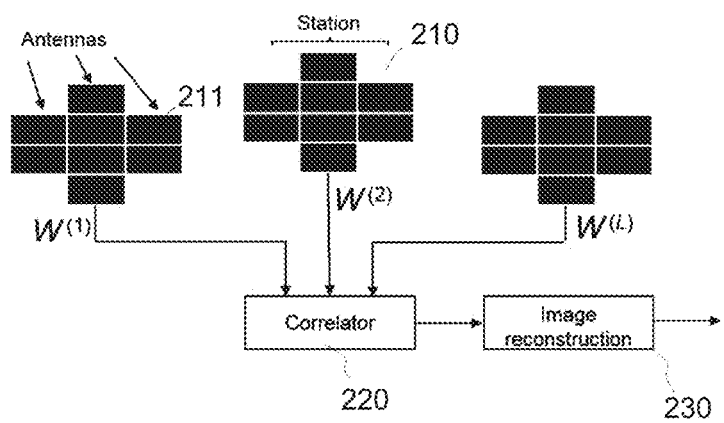
FIG. 2 is a block diagram schematically illustrating selected components of a radio interferometry system (a radio interferometer with stations and beamforming matrices), according to embodiments.

Referring now to FIG. 2, in embodiments, the present methods can be applied to radio interferometry, i.e., the beamformed signals are signals received from arrays of antennas 211, the arrays corresponding to antenna stations 210. A correlator unit 220 is typically involved, which receives (i.e., step S30 in FIG. 1) the beamformed signal data from the arrays 210 and compute a correlation matrix therefrom. The correlation matrix comprises the signal data representing the signals, to be subsequently processed by the image reconstruction unit 230.

Figure 3:
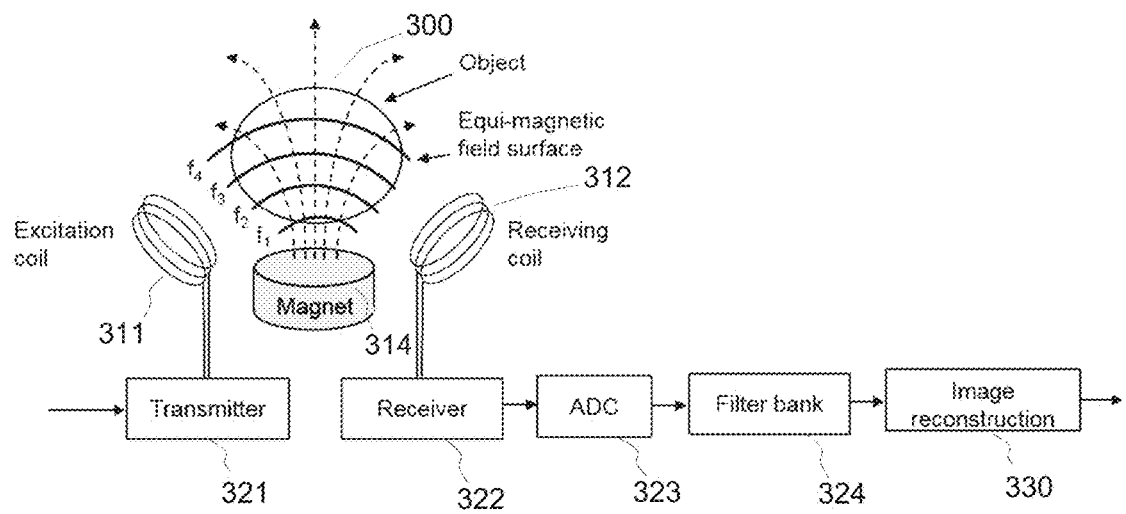
FIG. 3 is a block diagram schematically illustrating selected components of a magnetic resonance imaging system, according to embodiments.

Referring to FIG. 3, the present methods may, in other embodiments, be applied to beamformed signals received from radiofrequency coils 311, 312 of a magnetic resonance imaging hardware 311-324. Here the arrays of receiving elements correspond to sets of radiofrequency coils (only one such set is depicted in FIG. 3, for simplicity).

Similarly, the beamformed signals received may be signals from arrays of ultrasound sensors and the image data obtained may be used to reconstruct an ultrasound image.

Note, however, that beamforming is not a pre-requisite for implementing embodiments of the present invention. Indeed, the signal samples provided by the receiving elements may, in variants, be directly mapped to the measurement nodes. In other variants, the signal samples initially obtained from the receiving elements may be subject to any suitable pre-processing before being mapped to the measurement nodes.

Figure 12:
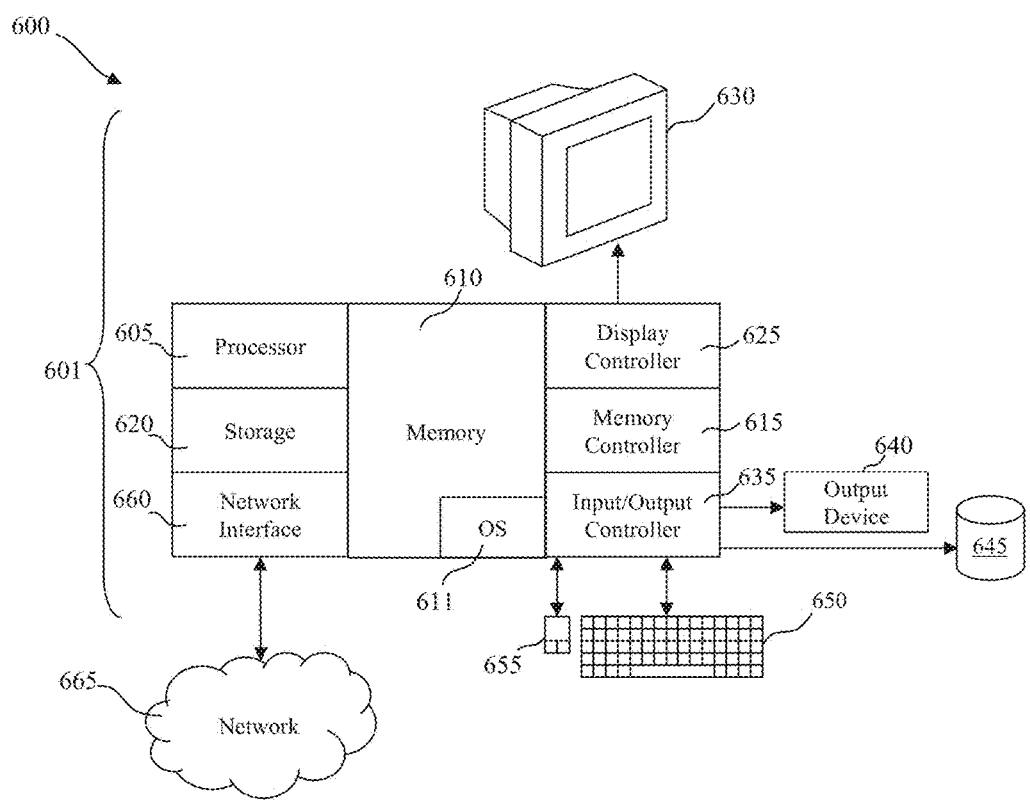
FIG. 12 schematically represents a general purpose computerized system, suited for implementing one or more method steps as involved in embodiments of the invention.

The image reconstruction units 230, 330 of FIGS. 2, 3 can be (functional) parts of a computerized system 600, such as depicted in FIG. 12. The invention can be embodied as such a system, the latter essentially comprising one or more processing units 605 and a memory 610. The memory is equipped with suitable computerized methods, which are configured for implementing at least some of the steps described earlier (and notably steps S30-S100). The invention may otherwise be embodied as a computer program product, having a computer readable storage medium with program instructions embodied therewith, the instructions executable by a system such as system 600 to cause to implement the same steps.

The above embodiments have been succinctly described in reference to the accompanying drawings and may accommodate a number of variants. Several combinations of the above features may be contemplated. Examples are given in the next section, where exemplary results obtained with the present methods are furthermore discussed.

2. Detailed, Specific Embodiments 2.1 General Considerations, Motivations

Modern large-scale radio telescope arrays use antenna stations composed of multiple antennas that are closely placed for imaging the sky. The signals received by the antennas at a station are combined by beamforming to reduce the amount of data to be processed in the later stages. Currently, beamforming at antenna stations is typically done by conjugate matched beamforming towards the center of the field of view at all antenna stations. Random beamforming techniques have also been also proposed. The signals transmitted by the stations are then correlated to obtain so called visibilities, which roughly correspond to the samples of the Fourier transform of the sky image. The reconstruction of the sky image is thus obtained from the inverse Fourier transform of the entire collection of visibility measurements.

One challenge in medical imaging is known to be the miniaturization of magnetic resonance imaging (MRI) and nuclear magnetic resonance (NMR) spectroscopy systems. The realization of scaled down MRI and NMR systems is a goal in medical tomography imaging because of the numerous potential applications in non-invasive imaging for point-of-care diagnostics. To design a portable magnetic resonance (MR) system, however, the dimensions of all the components of the spectroscopy system need to be reduced, while maintaining the parameters that characterize large MR systems, including sensitivity, detection time, spectral resolution, and spatial resolution. Importantly, the required ability to operate in a non-uniform magnetic field permits the elimination of the large and expensive superconductive magnets.

In practically all the above mentioned applications, the observation model can be formulated as $$\rho_k = V_k s + \eta_k, \qquad (1)$$

where $\{\rho_k\}$ is a sequence of M×1 data vectors, which are obtained at the measurement time instants kT, k=0, 1, ..., K, $\{V_k\}$ is a sequence of M×N measurement matrices, which in general are time varying, and depend on the system physical characteristics. The vector s is an N×1 vector, whose elements are the amplitudes of hypothetical point signal sources that are located in a given region, and $\{\eta_k\}$ is a sequence of M×1 measurement noise vectors, modeled as additive white Gaussian noise vectors. The dimension M is in general a function of the number m of sensors and L of stations in the array, and of the dimensions of the beamforming matrices. The region where the signal sources are located is usually defined as the field of view for 2D imaging or, more generally, as the region of interest.

Two approaches are typically considered to obtain the desired solution within the problem defined by (1). If the solution is sparse, that is, if the expected number of nonzero elements of s is small and not larger than the number of linear equations provided by (1), $l_1$ minimization is usually considered, either in the formulation known as Basis Pursuit (BP), or in the alternative formulation known as Basis Pursuit De-Noising (BPDN), or LASSO (Least Absolute Shrinkage and Selection Operator). The solution of both BP and BPDN can be obtained by convex optimization using linear programming (LP) algorithms. However, the high computational complexity of LP presents an obstacle for the large problem sizes that occur very often in applications as considered herein. An appealing alternative to LP algorithms is represented by iterative thresholding algorithms, because of their low computational complexity.

Figure 4:
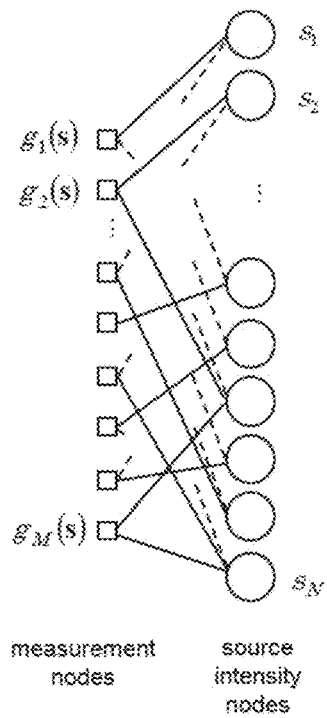
FIG. 4 is a factor graph representation of a system model, as involved in embodiments.

In cases for which sparsity is not an appropriate a priori assumption, Bayesian techniques are typically considered. Very often used in practice are techniques leading to image reconstruction by maximization of the posterior probability density function (pdf) $p(s|\rho_k)$. While exact computation of the posterior probability is computationally prohibitive, a computationally efficient method to obtain an approximation of the marginal posteriors is given by loopy belief propagation (LBP) on the factor graph. Such a graph is depicted in FIG. 4. Round nodes denote the variables $\sigma_i$, i=1, ..., N, and square nodes denote the factors $g_j(s)=p(\rho_j|s)$, j=1, ..., M, in the posterior pdf. In LBP, messages are exchanged between the nodes of the factor graph until they converge. Messages take the form of pdfs, which iteratively propagate the local belief in the neighborhood of a variable. According to the sum-product algorithm for LBP, the message sent by a variable node along a given edge is given by the product of the incoming messages on all other edges, whereas the message sent by a function node along a certain edge is the integral of the product of the characteristic function of the node and the incoming messages on all other edges, whereby the integration is performed over all variables other than the one connected to the edge along which the message travels.

Approximate message passing (AMP) algorithms are known, which efficiently implement the sum-product LBP algorithm. The AMP algorithm exhibits very low computational complexity and has the remarkable property that its solutions are governed by a state evolution whose fixed points (when unique) yield the true posterior means, in the limit M, N→∞, with the ratio M/N fixed, and assuming the elements of $V_k$ are independent and identically distributed (i.i.d.) Gaussian random variables.

Furthermore, the AMP algorithm can be equivalently formulated as an iterative thresholding algorithm, thus providing the reconstruction power of the BP and BPDN approaches when sparsity of the solution can be assumed.

In several applications, the vector s of hypothetical signal sources entails a large number of elements, especially in the case the region of interest is very large, or images with high resolution are required. For example, sky images with as many as $10^8$ pixels are required for specific astronomical investigations. In such cases, the memory and computational requirements for the implementation of algorithms (even with very low complexity, such as the AMP algorithm) become extremely challenging.

As it can be realized, it would be remarkably advantageous to devise a method that combines the efficiency and the convergence properties of the AMP algorithm with a substantial reduction of the memory and computational requirements for image recovery with a desired resolution. A further challenge is posed when the required resolution is not uniform over the field of view or region of interest, as in the case where sources very close to each other need to be resolved in the sky, or local anomalies are detected in the tissue of an organ in the human body.

2.2 Summary of Specific Embodiments Using AMP Methods

A novel method is presented below for image recovery from signals received by sensor arrays in several application fields, including medical imaging and radio interferometry, based on the iterative scanning of a region of interest. Scanning is achieved by subdividing the region of interest into subsets of points on a grid, applying beamforming to focus on the points of each of the subsets in sequence, and extracting information about source intensities from each subset. The overall image is reconstructed by combining the information recovered from each subset, as described in sect. 1.

However, here a modified AMP algorithm over a factor graph connecting source intensity nodes and measurement nodes is preferably used to recover (with low computational effort) the intensities associated with sources located at each subset. At each scanning iteration, the subsets may be modified to achieve two goals: first, a subset may be augmented with points corresponding to sources identified in previous iterations, to reduce the level of background clutter; second, one or more subsets may be defined on a finer grid to achieve a better image resolution in a portion of the region of interest.

One advantage of the specific embodiments discussed here is the remarkable reduction of the memory and computational requirements, in comparison to prior-art methods known to the present inventors. A further advantage is the capability of efficiently achieving different image resolution in different portions of the region of interest. Another advantage is the inclusion of the above iterative imaging technique in a feedback loop, where the information retrieved at the end of a scanning iteration is processed to determine subsets of points in the next iteration that are found to be relevant for the investigation of the region of interest, as discussed in the previous section.

2.3. Image Reconstruction in Radio Interferometry

As a first preferred example, image reconstruction in radio interferometry is considered. Assume a radio interferometer with L antenna stations, where the i-th station comprises $L_i$ antennas. The positions of the antennas at the i-th station are denoted by the vectors $p_j^{(i)}$, j=1, ..., $L_i$. The antennas receive narrow-band signals centered at the frequency $f_0$.

The signal received at the i-th antenna station from a source $s_q$ in a direction identified by the unit vector $r_q$ is expressed as $$x_q^{(i)} = a^{(i)}(r_q) s_q \qquad (2)$$

where $a^{(i)}(r_q)$ is the $L_i \times 1$ antenna array steering vector for the i-th station and direction $r_q$, given by $$a^{(i)}(r_q) = \begin{pmatrix} e^{-j2\pi \langle p_1^{(i)}, r_q \rangle} \\ \vdots \\ e^{-j2\pi \langle p_{L_i}^{(i)}, r_q \rangle} \end{pmatrix}, \qquad (3)$$

where $\langle p, r \rangle$ denotes the inner product between the vectors p and r. Assuming there are Q point sources in the sky, by expressing the signals emitted by the sources as a complex vector $s_q$ with dimension Q×1, the overall signal received at the i-th antenna station is given by $$x^{(i)} = A^{(i)}(r_q) s_q + \eta^{(i)}, \qquad (4)$$

where the matrix $A^{(i)}$ with dimensions $L_i \times Q$ is formed by the column vectors $a^{(i)}(r_q)$, q=1, ... Q, and $\eta^{(i)}$ denotes the noise vector at the i-th antenna.

Beamforming at i-th station is equivalent to a linear transformation of the signal $x^{(i)}$ by a beamforming matrix denoted by $W^{(i)}$, with dimensions $L_i \times M_i$, where $M_i$ is the number of beamforms used at that station. The beamformer output at the i-th station is thus expressed as $$x_b^{(i)} = W^{(i)H} x^{(i)} = W^{(i)H}(A^{(i)} s_q + \eta^{(i)}), \qquad (5)$$

where $W^H$ denotes the conjugate transpose of the matrix (or vector) W. The expected value of the correlator output that uses the beamformed signals from the L stations to produce the visibilities for image reconstruction is given by $$R = E\left[\begin{pmatrix} x_b^{(1)} \\ x_b^{(2)} \\ \vdots \\ x_b^{(L)} \end{pmatrix}\right] (x_b^{(1)H} \; x_b^{(2)H} \; \ldots \; x_b^{(L)H}) = \begin{pmatrix} R^{(1,1)} & R^{(1,2)} & \ldots \\ \vdots & \ddots & \vdots \\ R^{(L,1)} & \ldots & R^{(L,L)} \end{pmatrix} \qquad (6)$$

where $R^{(i,j)}$ denotes the $M_i \times M_j$, correlation matrix between $x_b^{(i)}$ and $x_b^{(j)}$, expressed as $$R^{(i,j)} = W^{(i)H}(A^{(i)} \Sigma_s A^{(j)H} + \Sigma_\eta^{(i,j)}) W^{(j)} \qquad (7)$$

and where, in the assumption of independent Gaussian sources generating the received signals and independent Gaussian antenna noise signals, the correlation matrix of the signals emitted by the sources $E_s$ is a Q×Q diagonal matrix, and the correlation matrix of the noise signals $\Sigma_\eta^{(i,j)} = \delta(i,j) \Sigma_\eta^{(i)}$, where $\delta(i,j)$ denotes the Kronecker delta, is a nonzero $L_i \times L_i$ diagonal matrix for i=j, and a zero $L_i \times L_j$ matrix otherwise. A block diagram of a radio interferometer with L stations and beamforming matrices is shown in FIG. 2.

Observing (7), it turns out that each element in the correlation matrix $R^{(i,j)}$ can be expressed as a linear combination of the source intensities $s_i^2, i=1, \ldots, Q$, found in $\Sigma_s = \text{diag}(s_1^2, s_2^2, \ldots, s_Q^2)$, plus measurement noise arising from the antenna noise. In practice, an estimate of R is obtained from a finite number of samples. Therefore an additional disturbance may need to be taken into account, which arises from the deviation from the ideal values of both the correlation matrix estimates $\hat{\Sigma}_s$ of the source intensities and $\hat{\Sigma}_\eta^{(i)}$ of the antenna noise signals. In the assumption of Gaussian signals, it turns out that the random matrices $\hat{\Sigma}_s$ and $\hat{\Sigma}_\eta^{(i)}$ have a Wishart distribution with a number of degrees of freedom equal to the number of samples used for the estimation of R.

The embodiments discussed in this section are based on the following model of image formation. The imaging region, referred to as the region of interest, is first subdivided into a collection of hypothetical intensity sources at arbitrary positions, corresponding to the points on a grid in the region of interest. Finer grids yield finer final image resolution, but entail higher computational cost. For a single hypothetical source with unit intensity at the k-th point in the grid in the region of interest, i.e., $s_k^2=1$, and $s_j^2=0$ for $j \neq k$, the signal received at the correlator output is obtained in the ideal case of absence of disturbances by (6) and (7), with $\Sigma_s=$ diag($0, \ldots, 0, s_k^2=1, 0, \ldots, 0$), $\Sigma_\eta^{(i,j)}=0$, $\forall i,j$. The antenna steering vectors forming the columns of the matrices $A^{(i)}$, $i=1, \ldots, L$, are computed by considering the N direction vectors $\{r_n\}_{n=1}^N$, which are defined by the points in the grid. After the received signals for all the hypothetical sources in the grid have been determined, and considering the Hermitian symmetry of the correlation matrix, the obtained responses are reshaped to form a matrix V of dimensions M×N, where, assuming $\tilde{M}$ beamforms are used at each of the L stations, $M=\tilde{M}L(\tilde{M}L+1)/2$, and N is the number of points in the grid in the region of interest. Recalling that in radio interferometry the correlation samples, also known as visibilities, are collected over K short-term integration (STI) intervals, and that the antenna steering vectors may be considered constant within one STI, but are time varying in general, the observation model then becomes $$\begin{pmatrix} \rho_1 \\ \rho_2 \\ \vdots \\ \rho_K \end{pmatrix} = \begin{pmatrix} V_1 \\ V_2 \\ \vdots \\ V_K \end{pmatrix} s + \begin{pmatrix} \tilde{\eta}_1 \\ \tilde{\eta}_2 \\ \vdots \\ \tilde{\eta}_K \end{pmatrix} \quad (8)$$

where for the k-th STI $\rho_k$ denotes the vector of correlation samples, $V_k$ is the matrix of responses of point sources with unit intensity that are positioned on the assumed grid in the region of interest, $\tilde{\eta}_k$ is the vector of augmented measurement noise terms, modeled as i.i.d. Gaussian random variables having zero mean and variance $\tilde{\sigma}^2$, and s is the vector of intensities of hypothetical sources that are located at the grid points of the region of interest.

The expression (8) poses the problem of image reconstruction in radio interferometry in the form given by (1), thus enabling the application of an AMP algorithm.

As mentioned earlier, a preferred method is based on the iterative scanning of the fine grid defined over the region of interest. At the j-th iteration, scanning is achieved by subdividing the region of interest into a set $\mathfrak{J}^{(j)}$ of subsets of points on the grid, not necessarily uniform, and extracting information about source intensities in each subset in sequence. The observation of the hypothetical sources that are located at the i-th subset of points on the grid, $\Omega(i,j) \in \mathfrak{J}^{(j)}$, $i=1, \ldots, N(\mathfrak{J}^{(j)})$, where $N(\mathfrak{J}^{(j)})$ denotes the cardinality of $\mathfrak{J}^{(j)}$, is expressed as $$\begin{pmatrix} \rho_1 \\ \rho_2 \\ \vdots \\ \rho_K \end{pmatrix} = \begin{pmatrix} V_1^{(i,j)} \\ V_2^{(i,j)} \\ \vdots \\ V_K^{(i,j)} \end{pmatrix} s^{(i,j)} + \begin{pmatrix} \tilde{\eta}_1^{(i,j)} \\ \tilde{\eta}_2^{(i,j)} \\ \vdots \\ \tilde{\eta}_K^{(i,j)} \end{pmatrix} \quad (9)$$

where the vectors $s^{(i,j)}$ of intensities of hypothetical sources satisfy the condition $$\bigcup_{\Omega(i,j) \in \mathfrak{J}^{(j)}} s^{(i,j)} = s, \forall j. \quad (10)$$

Note that, for fixed i and j, there is a one-to-one correspondence between the elements of the vector $s^{(i,j)}$ and the elements of the set of direction vectors $\{r_n^{(i,j)}\}_{n=1}^{N(i,j)}$ at a certain station, which are defined by the i-th subset of points on the grid at the j-th iteration, $\Omega(i,j)$, with cardinality $N(i,j)$.

Beamforming matrices $W^{(l,i,j)}$, $l=1, \ldots, L$, are applied to match a subset of $\tilde{M}$ columns of the antenna steering vector matrices $A^{(l,i,j)}$, where the superscript indices identify the l-th station, the i-th subset of points in the region of interest, and the j-th scanning iteration. The assignment of the beamforming matrices to the stations is preferably done in a random fashion, that is, each matrix $W^{(l,i,j)}$ is formed by randomly selecting $\tilde{M}$ columns from $A^{(l,i,j)}$, without repeating the selection of a column corresponding to a direction vector for a certain point in the grid, until all points in the grid have been selected at least once. Note that there is a one-to-one correspondence between the hypothesized point sources and the beamforming vectors at all the stations if the cardinality of the i-th subset of points on the grid $\mathfrak{J}^{(j)}$ satisfies the condition $$N(i,j)=\tilde{M}L. \quad (11)$$

The AMP algorithm is applied over the factor graph of FIG. 4, where the variable nodes are the source intensities and the function nodes represent the measurements obtained from the correlation samples over K STI intervals as expressed in (8). To further reduce memory and computational requirements, the measurements obtained by one STI interval at a time are considered. Let us then consider the application of the AMP algorithm used to extract information about the hypothetical source intensities at the points in the i-th subset during the j-th scanning iteration, $\Omega(i,j)$, at the k-th STI interval. The estimation of the source intensities $\hat{s}^{(i,j)}$ would ideally require to compute the posterior pdf $$p(s^{(i,j)}|\rho_k) \propto p(\rho_k|s^{(i,j)}) p_k(s^{(i,j)}) = \prod_{m=1}^{M} p(\rho_{k,m}|s^{(i,j)}) \prod_{n=1}^{N(i,j)} p_k(s_n^{(i,j)}) \quad (12)$$

where $$p(\rho_{k,m}|s^{(i,j)}) \equiv g_{k,m}(s^{(i,j)}) \propto N(\rho_{k,m}; v_{k,m}^{(i,j)T} s^{(i,j)}, \tilde{\sigma}^2), \quad (13)$$

where $N(x; m, \sigma^2)$ denotes a Gaussian distribution with mean m and variance $\sigma^2$, and $v_{k,m}^{(i,j)T}$ is the m-th row of the matrix $V_k^{(i,j)}$. The prior probability of the source intensities at the first STI interval is assumed to have a Bernoulli—Log Normal distribution, that is, $$p_1(s_n^{(i,j)}) = \lambda G(s_n^{(i,j)}; \mu_s, \sigma^2) + (1-\lambda) \delta(s_n^{(i,j)}), \lambda > 0, \quad (14)$$

with $G(x; m, \sigma^2)$ denoting a Log Normal distribution with mean m and variance $\sigma^2$. The computation of the minimum mean-square-error (MMSE) estimates of the source intensities $\mu_{k,n}^l$ and their variances $\chi_{k,n}^l$ at the l-th iteration of the AMP algorithm within the k-th STI interval is described in detail in the Appendix subsection.

If the AMP algorithm within the k-th STI interval is stopped at the j'-th iteration, the MMSE estimates are used to define a new prior with a Gaussian distribution $p_{k+1}(s_n^{(i,j)}) = N(s_n^{(i,j)}; \mu_{k,n}^{j'+1}, \chi_{k,n}^{j'+1})$ for the application of the AMP algorithm within the (k+1)-th STI interval to continue refining the estimation of the source intensities. The procedure continues over the K STI intervals, until the AMP algorithm is applied within the K-th STI interval, leading to the final MMSE estimate of $s_n^{(i,j)}$, expressed by $\mu_{K,n}^{L+1}$.

As stated earlier, the AMP algorithm yields the true posterior means, in the limit M, N→∞, provided the ratio M/N is fixed, and assuming the elements of $V_k^{(i,j)}$ are i.i.d. Gaussian random variables. In practice, however, both the number of variable nodes N and of function nodes M are finite, and the elements of $V_k^{(i,j)}$ may significantly deviate from a Gaussian distribution, depending on the application. Thus, the two following modifications of the considered AMP algorithm are preferably introduced to obviate the above mentioned limitations.

2.3.1. Randomization. The observation is made that the factor graph of FIG. 4 is fully connected and hence exhibits a large number of short cycles, leading to a non-negligible average estimation error. This effect is mitigated by introducing a random permutation of the function nodes at the end of each iteration of the AMP algorithm.

2.3.2. Pruning. As in the considered applications the condition M>>N is usually satisfied, sufficient flow of information within the factor graph is achieved if some of the messages going from the function nodes to the variable nodes are pruned. The objective of the pruning is to allow only a subset of the messages $\{v_{g_{k,m} \to \sigma_n}^l(s_n^{(i,j)})\}$ to be considered for the computation of the estimate of $s^{(i,j)}$, such that the distribution of the coefficients of the matrix $V_k^{(i,j)}$, which correspond to the allowed connections in the factor graph, is approximately Gaussian.

The modified AMP algorithm is applied to obtain estimates $\{\hat{s}^{(1,j)}, \ldots, \hat{s}^{(N(\Im^{(j)}),j)}\}$ at the j-th scanning iteration for the hypothetical point source variables in each of the $N(\Im^{(j)})$ subsets from the observations $\rho_k$, spanning K STI intervals. Recalling (12), an estimate of the vector $\hat{s}^{(j)}$ of intensities of hypothetical sources on the points of the grid can be obtained by combining the information recovered from each subset $\Omega(i,j)$, i=1, ..., $N(\Im^{(j)})$, possibly by averaging estimates of intensities at points that belong to more than one subset $\Omega(i,j)$, thus completing the j-th iteration of the scanning beamforming method. The presence of sources at points of the grid is detected by a threshold operation on the elements of the vector $\hat{s}^{(j)}$.

At the (j+1)-th scanning iteration, the subsets $\Omega(i,j+1) \in \Im^{(j+1)}$, i=1, ..., $N(\Im^{(j-1)})$, may be modified with respect to the subsets defined for the j-th iteration to achieve two goals: first, a subset may be extended with points corresponding to sources identified in the previous iteration to reduce the level of background clutter; second, one or more subsets may be defined on a finer grid to achieve a better image resolution in a portion of the region of interest.

After a predefined number J of iterations of the scanning beamforming method has been completed, or a desired accuracy has been achieved in the estimate of the vector $\hat{s}^{(J)}$ of intensities of hypothetical sources on the points of the grid, as measured by the variance of the estimates (A13), the process terminates. Note that the present image recovery technique based on iterative scanning beamforming may be included in a feedback loop, where the information retrieved at the end of an iteration is processed to determine subsets of points in the next iteration, which are relevant for the investigation of the region of interest. For example, this could be the case in radio interferometry if astronomical sources are detected that are very close to each other and need to be better resolved in the sky, or in ultrasound medical imaging if anomalies are detected in the tissue of an organ in the human body and better local imaging resolution is required to achieve an accurate and reliable diagnosis.

Figure 10:
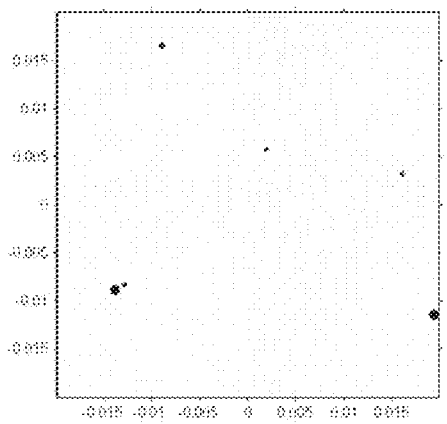
FIG. 10-10*d* are 2D plots illustrating intensity distributions in an illustration example (sky image).

An example of iterative scanning beamforming method is now discussed, which uses simulations of a radio interferometry system with 24 antenna stations having 8 antennas each, and forming 4 matched beams per station by randomly selecting four direction vectors in a subset of the grid representing the field of view, as described above. The geographical distribution of the stations and the antennas corresponds to the locations of the LOFAR array. The assumed radius of the field of view is 0.02 rad. In the field of view 6 point sources are found, with intensities having a Rayleigh distribution with variance $\sqrt{(\pi/2)} \sim 1.25$, as shown in FIG. 10 (free scale, negative image). Correlation of the received antenna signals is performed over 768 samples within an STI interval of 1 s. The variance of the measurement noise $\Sigma_n^{(i)}$ is assumed equal to 100. For the application of the present embodiment, the field of view is subdivided into a collection of hypothetical intensity sources at arbitrary positions, corresponding to the uniformly distributed points on a 100×100 grid.

The scanning of the field of view takes place over 100 subsets, i.e., $N(\Im^{(j)})=100$, for all j. At the first scanning iteration, the subsets are uniformly chosen within the 100× 100 grid, i.e., the points in each subset are uniformly distributed over a 10×10 grid, with minimum distance between points that is 10 times the minimum distance between points in the fine grid. The estimation of the source intensities for the points of each subset is achieved by the modified AMP algorithm described above. For the estimation of the source intensities within each subset, samples collected over one STI interval are considered, with 32 iterations of the modified AMP algorithm. The matrices $V_k^{(i,j)}$ in (8) are assumed to be constant over k. In practice, however, the time varying characteristic of the antenna steering vectors, and hence of the matrices $V_k^{(i,j)}$, needs to be taken into account. The modified AMP algorithm is implemented. Therefore random permutation of the function nodes is applied in the factor graph at each message passing iteration. Furthermore, pruning of selected messages going from the function nodes to the variable nodes is also adopted to approximate a Gaussian distribution of the elements of the matrices $V_k^{(i,j)}$. A coarse approximation of the desired distribution, which turns out to yield satisfactory results, is achieved by pruning a message from a function node to a variable node if the following condition on the (n,m)-th element $v_{k,m,n}^{(i,j)}$ of the matrix $V_k^{(i,j)}$ is not satisfied:

$$\text{Re}\{v_{k,m,n}^{(i,j)}\} < 0.1 \wedge \text{Im}\{v_{k,m,n}^{(i,j)}\} > -0.1. \tag{15}$$

Figure 13A:
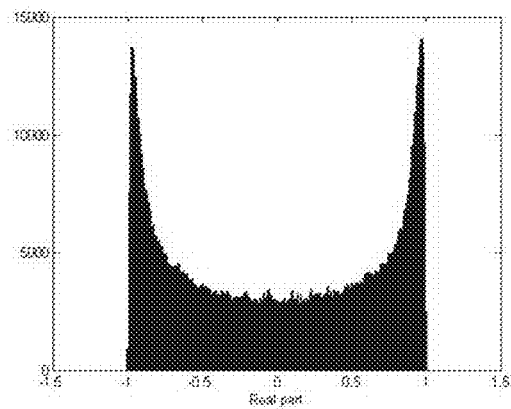
FIGS. 13A and 13B illustrate distributions of the real and imaginary parts of matrix elements involved in a message passing algorithm used to reconstruct images.
Figure 13B:
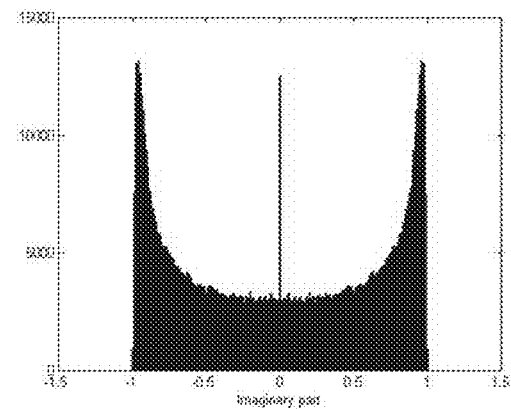
Figure 14A:
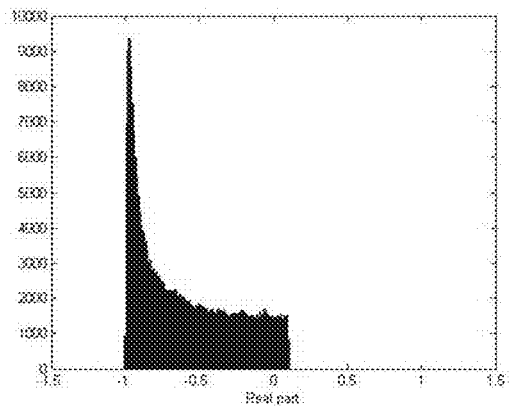
FIGS. 14A and 14B show the real and imaginary parts, respectively, of the elements of retained after pruning of the messages.
Figure 14B:
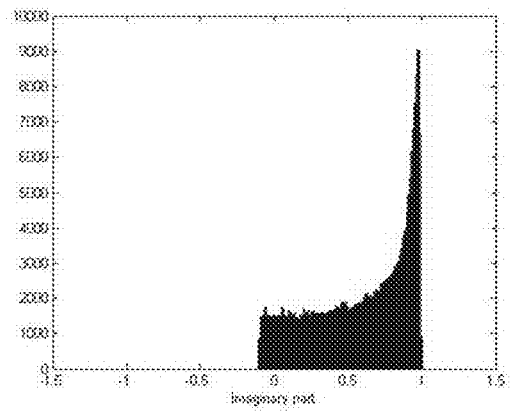

FIGS. 13A and 13B illustrate a typical distribution of the real and imaginary parts, respectively, of the elements of a matrix $V_k^{(i,j)}$, whereas FIGS. 14A and 14B show the real and imaginary parts, respectively, of the elements of $V_k^{(i,j)}$ that are retained after pruning of the messages (thus effectively contributing to the modified AMP algorithm), which amount to about one fourth of the total number of the elements of $V_k^{(i,j)}$.

Figure 10A:
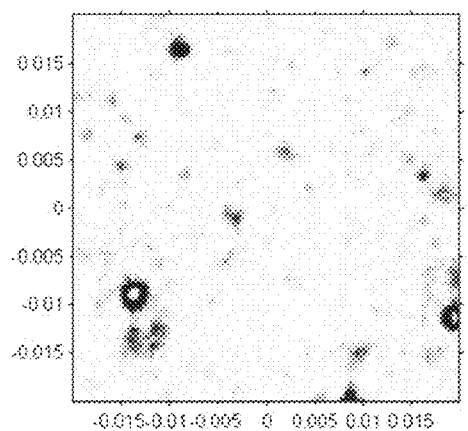
Figure 10B:
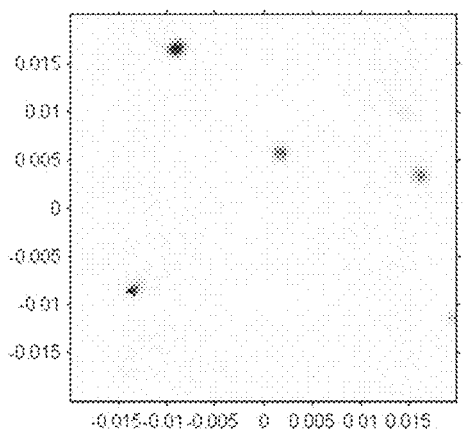
Figure 10C:
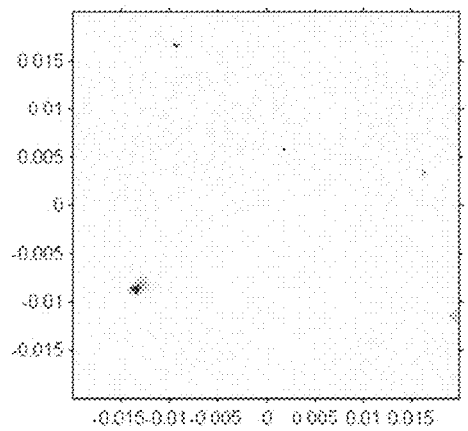
Figure 10D:
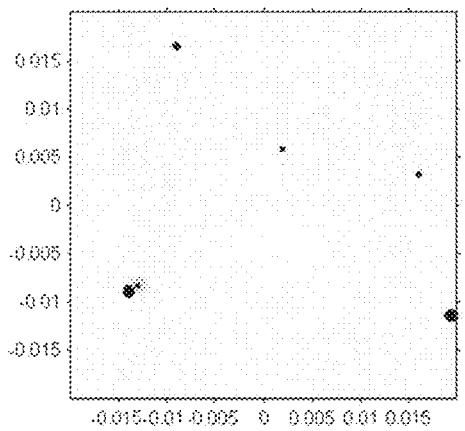
Figure 11:
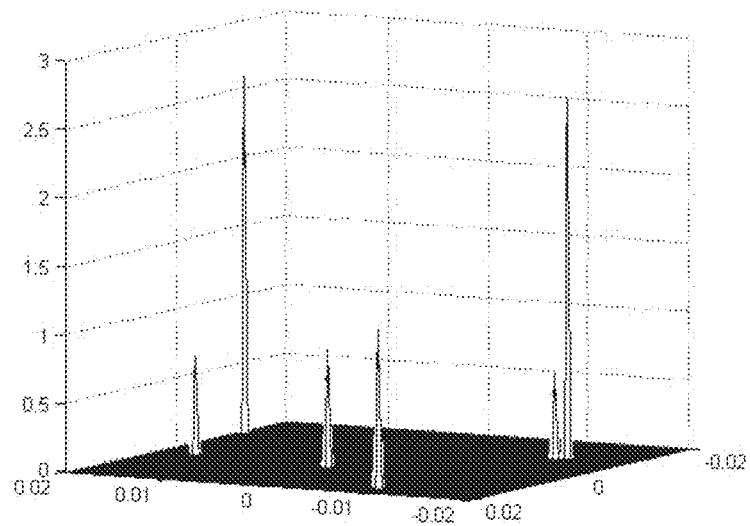
FIGS. 11 and 11*a* respectively show 3D mesh surfaces of source intensities in a noiseless target sky (corresponding to FIG. 10) and estimated source intensities from real-like, noisy signals, as obtained after the $3^{rd}$ iteration (and corresponding to FIG. 10*c*), according to embodiments.
Figure 11A:
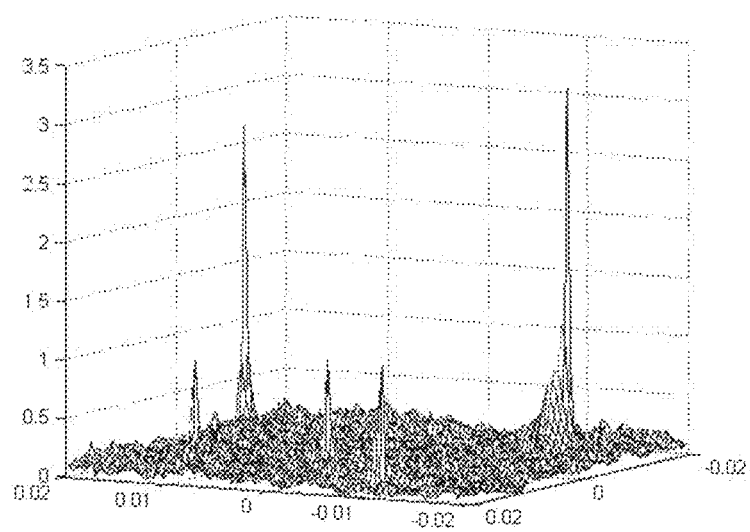

The final reconstructed image is obtained after three scanning iterations. The reconstructed images after each iteration are shown in FIG. 10a to 10c, respectively. After the first iteration, the threshold is set at 1.4, corresponding to about one half the amplitude of the strongest detected source, which leads to the detection of the three strongest sources. At the second scanning iteration, each subset is augmented to include the three points corresponding to the detected sources, in order to reduce the clutter in the recovered information. After the second iteration, the threshold is set at 0.6, corresponding to about one fourth the amplitude of the strongest detected source, which leads to the detection of the five strongest sources. At the third scanning iteration, each subset is then augmented to include the five points corresponding to the five detected sources. The superposition of the target sky image and the reconstructed sky image after the third scanning iteration is shown in FIG. 10d. The 3-D mesh surfaces of the noiseless target sky and the reconstructed image from noisy signals are shown in FIGS. 11a and 11b, respectively, to allow a comparison of the target and estimated intensities of the point sources in the 100×100 grid.

2.4. Image Reconstruction in Magnetic Resonance Systems

As a second, specific embodiment, image reconstruction in magnetic resonance systems is considered. In particular, MRI and NMR spectroscopy with scaled-down components are considered, because of their numerous non-invasive medical applications, e.g., for point-of-care diagnostics, with small permanent magnets providing up to 1.5 T magnetic fields, which replace large and expensive superconductive magnets generating fields in excess of 10 T, up to 11 T. Through the reciprocity theorem in electromagnetic theory, the electromotive force (emf) voltage induced in a coil of a MR system is given by $$E(t) = -\int_V \frac{\partial \langle B_N(r), M(r, t) \rangle}{\partial t} dV \qquad (16)$$

where M(r,t) is the magnetic moment originated by the static magnetization field $B_0$ in the sample volume V, and $B_N(r)$ denotes the magnetic coupling between the sample and the coil, defined as the magnetic field generated by the current of 1 A in the coil at point r in space.

A main challenge for the extraction of 3-D imaging information in MR systems with small permanent magnets stems from the non-uniform static magnetic fields that are obtained. In fact, non-uniformity of the static magnetic field has two undesired consequences. First, a sample containing magnetic dipoles, e.g., protons with resonance frequency of 42.58 MHz/T, exhibits a wide range of coordinate-dependent resonance frequencies when placed in such a field. Second, the transversal relaxation of the dipoles becomes extremely short, resulting in a fast decaying MR signal, in non-uniform magnetic fields. This is mainly due to the diffusion spreading of the dipoles, i.e., the magnetized dipoles can move to adjacent volumes with slightly different resonance frequencies, with consequent de-phasing of the signal. Typical resonance frequencies for medical applications with static magnetic fields of about 1 T are in the range from 5 to 50 MHz, with decay maximum rates of about 0.1 ms, requiring a detection bandwidth in excess of 10 kHz to capture a signal before de-phasing. Therefore an MR transceiver for such applications generates wideband excitation signals that are sent to one or more excitation coils 311 (FIG. 3) in K consecutive measurement bursts, and processes signals received after each burst from one or more receiving coils 312 to detect narrowband signals at the output of J subchannels of a filter bank 324, as illustrated in FIG. 3. The position of the magnet 314 is usually modified after each measurement to differentiate the spectral contributions to the received signal from each volume element.

To construct an image using MRI, in particular MRI with a non-uniform static magnetic field, let us consider an initial inhomogeneous magnetic field $B_0(r)$, and, for given time-varying excitation signals, the magnetic moment M(r,t). If the normalized magnetic field of the k-th measurement at the volume element $\Delta V$ centered at the point with coordinates $r_0(x_0,y_0,z_0)$ is $B_N^{(k)}(r_0)$, then, recalling (16), the induced potential of this volume element at the receiving coil is given by $$\varepsilon^{(k)}(t, r_0) = -\frac{\partial \langle B_N^{(k)}(r_0), M_N(r_0, t) \rangle}{\partial t} s(r_0) \Delta V, \qquad (17)$$

where $M_N$ ($r_0$, t) denotes the normalized magnetic moment, and $s(r_0)$ the magnetic dipole density at $r_0$. The signal $\varepsilon^{(k)}(t,r_0)$ is narrowband if $\Delta V$ is small compared to the magnetic gradient in its volume. The center frequency is located around the resonance frequency at $r_0$, expressed as $\omega(r_0)=\gamma|B_0(r_0)|$, where $\gamma$ denotes the gyromagnetic ratio. The imaging problem is thus formulated as finding the distribution of the magnetic dipole density s(r) within the region of interest, which is subdivided into the N volumes $\Delta V_1, \ldots, \Delta V_N$, centered around the grid points $r_1, \ldots, r_N$. Recalling that at the k-th measurement the magnetic spectrum response is observed at the output of J subchannels centered at the frequencies $\omega_1, \ldots, \omega_J$, the following linear system is obtained $$\begin{pmatrix} E_1^{(k)} \\ E_2^{(k)} \\ \vdots \\ E_J^{(k)} \end{pmatrix} = \begin{pmatrix} f_{1,1}^{(k)} & f_{1,2}^{(k)} & \cdots & f_{1,N}^{(k)} \\ f_{2,1}^{(k)} & f_{2,2}^{(k)} & \cdots & f_{2,N}^{(k)} \\ \vdots & \vdots & \ddots & \vdots \\ f_{J,1}^{(k)} & f_{J,2}^{(k)} & \cdots & f_{J,N}^{(k)} \end{pmatrix} \begin{pmatrix} s(r_1) \\ s(r_2) \\ \vdots \\ s(r_N) \end{pmatrix} + \begin{pmatrix} \eta_1^{(k)} \\ \eta_2^{(k)} \\ \vdots \\ \eta_J^{(k)} \end{pmatrix} \qquad (18)$$

where $E_j^{(k)}$ denotes the amplitude of the induced signal at the j-th subchannel output, $\eta_j^{(k)}$ is the corresponding measurement noise, and the function $f_{j,n}^{(k)}$ is defined as $$f_{j,n}^{(k)} = \qquad (19)$$
$$\begin{cases} -\frac{\partial \langle B_N^{(k)}(r_n), M_N(r_n, t) \rangle}{\partial t} \Delta V_n, & \text{if } \omega_j - \delta \leq \gamma|B_0(r_n)| \leq \omega_j + \delta \\ 0 & \text{otherwise} \end{cases}.$$

In vector form, (18) becomes $$E^{(k)} = F^{(k)} s + \eta, \qquad (20)$$

which reflects the general expression (1), enabling the application of the present method.

2.5 Appendix

Following standard notation, at the l-th iteration of the AMP algorithm within the k-th STI interval the message passed from a function node $g_{k,m}$ to a variable node $s_n$ is denoted by $v_{g_{k,m} \to s_n}^l(\bullet)$, whereas the message passed from a variable node $s_n$ to a function node $g_{k,m}$ is denoted by $v_{s_n \to g_{k,m}}^l(\bullet)$. Using central-limit theorem (CLT) arguments, for large N(i,j), i.e., for a large number of points in the subset $\Omega(i,j)$, the resulting effect of the received messages $\{v_{s_n \to g_{k,m}}^l\}_{n=1}^{N(i,j)}$ at the function nodes can be approximated as Gaussian. Consequently, it is sufficient to parameterize each message $v_{s_n \to g_{k,m}}^l(\bullet)$ by only its mean $\mu_{k,nm}^l$ and variance $\chi_{k,nm}^l$. Recalling the Gaussian expression of $g_{k,m}(s^{(i,j)})$, the CLT then implies $$v_{g_{k,m} \to s_n}^l(s_n^{(i,j)}) \approx N\left(s_n; \frac{z_{k,mn}^l}{V_{k,mn}^{(i,j)}}, \frac{c_{k,mn}^l}{|V_{k,mn}^{(i,j)}|^2}\right) \quad \text{(A1)}$$

where $$z_{k,mn}^l = \rho_{k,m} - \sum_{q \neq n} V_{k,mq}^{(i,j)} \mu_{k,qm}^l \quad \text{and} \quad \text{(A2)}$$

$$c_{k,mn}^l = \tilde{\sigma}^2 + \sum_{q \neq n} |V_{k,mq}^{(i,j)}|^2 \chi_{k,qm}^l. \quad \text{(A3)}$$

The updates of the mean $\mu_{k,nm}^{l+1}$ and variance $\chi_{k,nm}^{l+1}$ are obtained from $$v_{s_n^{(i,j)} \to g_{k,m}}^{l+1}(s_n^{(i,j)}) \propto p_k(s_n^{(i,j)}) \prod_{l \neq m} v_{g_{k,l} \to s_n^{(i,j)}}^l(s_n^{(i,j)}). \quad \text{(A4)}$$

Recalling that the prior distribution of the source intensities at the first STI interval is given by (14), and that the product of Gaussian terms is calculated from the expression $$\prod_q N(\sigma; \mu_q, v_q) \propto N\left(\sigma; \frac{\sum_q \mu_q/v_q}{\sum_q 1/v_q}, \frac{1}{\sum_q 1/v_q}\right), \quad \text{(A5)}$$

yields $$v_{s_n^{(i,j)} \to g_{1,m}}^{l+1}(s_n^{(i,j)}) \propto \quad \text{(A6)}$$

$$[\lambda G(s_n^{(i,j)}; \mu_s, \sigma_s^2) + (1 - \lambda)\delta(s_n^{(i,j)})] N(s_n^{(i,j)}; \xi_{1,nm}^l, \zeta_{1,nm}^l),$$

where, in general, at the k-th STI interval $$\xi_{k,m}^l = \frac{\sum_{q \neq m} V_{k,m}^{(i,j)*} z_{k,qn}^l / c_{k,qn}^l}{\sum_{q \neq m} |V_{k,qn}^{(i,j)}|^2 / c_{k,qn}^l} \quad \text{and} \quad \text{(A7)}$$

$$\zeta_{k,mn}^l = \frac{1}{\sum_{q \neq m} |V_{k,qn}^{(i,j)}|^2 / c_{k,qn}^l}. \quad \text{(A8)}$$

Using the approximations $G(x; m, \sigma^2) \approx N(x; m, \sigma^2)$ and $\lambda \approx 1$, and recalling that the source intensities are nonnegative, the mean and variance of $$v_{s_n^{(i,j)} \to g_{k,m}}^{l+1}(s_n^{(i,j)})$$

are given by $$\mu_{k,nm}^{l+1} \approx \max\left(0, \frac{\xi_{k,nm}^l}{1 + \zeta_{k,nm}^l/\hat{\sigma}_{s,k}^2}\right) \quad \text{and} \quad \text{(A9)}$$

$$\chi_{k,nm}^{l+1} \approx \frac{\zeta_{k,nm}^l}{1 + \zeta_{k,nm}^l/\hat{\sigma}_{s,k}^2}, \quad \text{(A10)}$$

where $\hat{\sigma}_{s,k}^2$ denotes the variance of the prior distribution of the source intensities at the k-th STI interval. After the l-th iteration of the AMP algorithm within the k-th STI interval, the posterior on $s_n^{(i,j)}$, i.e., $p^{l+1}(s_n^{(i,j)}|\rho_k^{(i,j)})$, is estimated as $$\hat{p}^{l+1}(s_n^{(i,j)} | \rho_k^{(i,j)}) \propto p_k(s_n^{(i,j)}) \prod_{l=1}^{\tilde{M}} v_{g_{k,j} \to s_n^{(i,j)}}^l(s_n^{(i,j)}) \quad \text{(A11)}$$

whose mean and variance determine the l-th iteration MMSE estimate of $s_n^{(i,j)}$ and its variance, respectively. Observing (A9) and (A4), these MMSE estimates become $$\mu_{k,n}^{l+1} \approx \max\left(0, \frac{\xi_{k,n}^l}{1 + \zeta_{k,n}^l/\hat{\sigma}_{s,k}^2}\right) \quad \text{and} \quad \text{(A12)}$$

$$\chi_{k,n}^{l+1} \approx \frac{\zeta_{k,n}^l}{1 + \zeta_{k,n}^l/\hat{\sigma}_{s,k}^2}. \quad \text{(A13)}$$

where $$\xi_{k,m}^l = \frac{\sum_{q=1}^{\tilde{M}} V_{k,qn}^{(i,j)*} z_{k,qn}^l / c_{k,qn}^l}{\sum_{q=1}^{\tilde{M}} |V_{k,qn}^{(i,j)}|^2 / c_{k,qn}^l} \quad \text{and} \quad \text{(A14)}$$

$$\zeta_{k,n}^l = \frac{1}{\sum_{q=1}^{\tilde{M}} |V_{k,qn}^{(i,j)}|^2 / c_{k,qn}^l}. \quad \text{(A15)}$$

3. Implementation Details

Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present invention can be implemented wherein general-purpose digital computers, such as personal computers, workstations, etc., are used.

For instance, the system 600 depicted in FIG. 12 schematically represents a computerized unit 601, e.g., a general-purpose computer. In exemplary embodiments, in terms of hardware architecture, as shown in FIG. 12, the unit 601 includes a processor 605, memory 610 coupled to a memory controller 615, and one or more input and/or output (I/O) devices 640, 645, 650, 655 (or peripherals) that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 605 is a hardware device for executing software, particularly that stored in memory 610. The processor 605 can be any custom made or commercially available processor, a central processing unit (CPU), an auxiliary processor among several processors associated with the computer 601, a semiconductor based microprocessor (in the form of a microchip or chip set), or generally any device for executing software instructions.

The memory 610 can include any one or combination of volatile memory elements (e.g., random access memory) and nonvolatile memory elements. Moreover, the memory 610 may incorporate electronic, magnetic, optical, and/or other types of storage media. Note that the memory 610 can have a distributed architecture, where various components are situated remote from one another, but can be accessed by the processor 605.

The software in memory 610 may include one or more separate programs, each of which comprises an ordered listing of executable instructions for implementing logical functions. In the example of FIG. 12, the software in the memory 610 includes methods described herein in accordance with exemplary embodiments and a suitable operating system (OS) 611. The OS 611 essentially controls the execution of other computer programs, and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 610, so as to operate properly in connection with the OS 611. Furthermore, the methods can be written as an object oriented programming language, which has classes of data and methods, or a procedure programming language, which has routines, subroutines, and/or functions.

Possibly, a conventional keyboard 650 and mouse 655 can be coupled to the input/output controller 635. Other I/O devices 640-655 may include other hardware devices.

In addition, the I/O devices 640-655 may further include devices that communicate both inputs and outputs. The system 600 can further include a display controller 625 coupled to a display 630. In exemplary embodiments, the system 600 can further include a network interface or transceiver 660 for coupling to a network 665.

The network 665 transmits and receives data between the unit 601 and external systems. The network 665 is possibly implemented in a wireless fashion, e.g., using wireless protocols and technologies, such as WiFi, WiMax, etc. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 665 can also be an IP-based network for communication between the unit 601 and any external server, client and the like via a broadband connection. In exemplary embodiments, network 665 can be a managed IP network administered by a service provider. Besides, the network 665 can be a packet-switched network such as a LAN, WAN, Internet network, etc.

If the unit 601 is a PC, workstation, intelligent device or the like, the software in the memory 610 may further include a basic input output system (BIOS). The BIOS is stored in ROM so that the BIOS can be executed when the computer 601 is activated.

When the unit 601 is in operation, the processor 605 is configured to execute software stored within the memory 610, to communicate data to and from the memory 610, and to generally control operations of the computer 601 pursuant to the software. The methods described herein and the OS 611, in whole or in part are read by the processor 605, typically buffered within the processor 605, and then executed. When the methods described herein are implemented in software, the methods can be stored on any computer readable medium, such as storage 620, for use by or in connection with any computer related system or method.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

The invention claimed is:

1. A computer-implemented method for recovering an image, comprising:
   accessing, via one or more processors, signal data representing signals;
   identifying, via one or more processors, subsets of points arranged so as to span a region of interest as current subsets of points;
   reconstructing, via one or more processors, an image based on current subsets of points, by combining signal data associated to the current subsets of points;
   detecting, via one or more processors, one or more signal features in a last image reconstructed;
   for each of the one or more signal features detected, modifying, via one or more processors, one or more subsets of the current subsets, so as to change a number of points of the one or more subsets, according to a location of said each of one or more signal features detected, whereby new current subsets of points are obtained; and
   repeating the above steps of reconstructing, detecting and modifying, as necessary to obtain a reconstructed image that satisfies a given condition.

2. The method of claim 1, wherein
   modifying comprises modifying said one or more subsets of the current subsets, so as to increase, for each of the modified one or more subsets, a relative number of points at a location of said each of the detected one or more signal features, wherein the relative number of points of a given subset at a given location is defined as the number of points of said given subset at the given location divided by the total number of points of said given subset.

3. The method of claim 2, wherein
   modifying comprises adding points to one or more of the current subsets of points, so as to increase, for each modified subset, the relative number of points at the location of said each of the detected one or more signal features.

4. The method of claim 3, wherein modifying comprises adding at most one point to each of the current subsets of points.

5. The method of claim 4, wherein identifying comprises identifying n disjoint subsets of points, the subsets identical under translation, as said current subsets of points.

6. The method of claim 5, wherein, modifying comprises, for a given detected signal feature, identifying one point of a given one of the current subsets, which point corresponds to said given detected feature, and adding one point to each of the remaining n−1 subsets of point, wherein the one point added corresponds to the location of said given detected signal feature.

7. The method of claim 1, wherein detecting one or more signal features in a last image reconstructed comprises scanning the current subsets of points.

8. The method of claim 7, wherein detecting one or more signal features in a last reconstructed image is performed by selecting one or more signal intensities that exceed, each, an intensity threshold.

9. The method of claim 7, wherein, at one or more iterations of the method, said intensity threshold is changed with respect to a previous iteration.

10. The method of claim 1, wherein, at accessing, the signal data are beamformed signal data representing beamformed signals that have been generated using beamforming matrices formed by sensor steering vectors.

11. The method of claim 10, further comprising, for a last reconstructed image that satisfies said given condition:
analyzing the last reconstructed image to detect one or more signal features therein;
instructing, based on an outcome of analyzing, to change the sensor steering vectors to generate new beamformed signal data; and
repeating said steps of reconstructing, detecting and modifying, as necessary to obtain a reconstructed image that satisfies a given condition.

12. The method of claim 11, wherein instructing to change the sensor steering vectors is performed to generate new beamformed signal data corresponding to a modified region of interest or a modified resolution of the region of interest.

13. The method of claim 1, wherein reconstructing an image based on current subsets of points is performed according to a message passing method in a bipartite factor graph.

14. The method of claim 1, wherein the method further comprises:
receiving the beamformed signal data from one or more arrays of receiving elements; and
computing a correlation matrix that comprises signal data representing signals.

15. The method of claim 14, wherein the beamformed signals received are signals from one or more arrays of receiving elements, where the receiving elements are antennas; and the one or more arrays of receiving elements correspond to one or more antenna stations.

16. The method of claim 1, wherein the signal data accessed represent signals obtained from radiofrequency coils of a magnetic resonance imaging hardware, and the one or more arrays of receiving elements correspond to one or more sets of radiofrequency coils.

17. The method of claim 1, wherein the signal data accessed represent signals obtained from ultrasound sensors, and the one or more arrays of receiving elements correspond to one or more sets of ultrasound sensors.

18. The method of claim 14, further comprising, prior to receiving the beamformed signals:
generating the beamformed signals.

19. The method of claim 13, wherein the message passing method used for reconstructing an image comprises:
accessing elements that respectively correspond to measurement values, which can be respectively mapped to measurement nodes;
performing message passing estimator operations to obtain estimates of random variables associated with variable nodes, according to a message passing method in a bipartite factor graph, wherein:
the measurement values are, each, expressed as a term that comprises linear combinations of the random variables;
each message exchanged between any of the measurement nodes and any of the variable nodes is parameterized by parameters of a distribution of the random variables;
performing the message passing estimator operations further comprises randomly mapping measurement values to the measurement nodes, at one or more iterations of the message passing method,
obtaining image data from the obtained estimates of the random variables; and
reconstructing an image from the obtained image data.

20. The method of claim 19, wherein performing message passing estimator operations comprises randomly mapping measurement values to the measurement nodes at each of the iterations of the message passing method.

21. The method of claim 19, wherein performing message passing estimator operations comprises:
performing first message passing estimator operations, whereby said measurement values are randomly mapped to the measurement nodes; and
performing second message passing estimator operations, wherein messages passed from measurement nodes to variable nodes are pruned, by forcing a distribution of coefficients of said linear combinations to satisfy a constraint.

22. The method of claim 21, wherein performing the second message passing estimator operations further comprises:
restricting the second message passing estimator operations to loop branches, for which the distribution of said coefficients satisfies said constraint.

23. The method of claim 19, wherein, at performing the message passing estimator operations, each message exchanged is parameterized by at least one of a mean and a variance of the distribution of the variables.

24. A system for recovering an image from signal data, the system comprising:

one or more processing units; and a memory comprising computerized methods, the latter configured, upon execution by the one or more processing units, for:

accessing signal data representing signals;

identifying subsets of points arranged so as to span a region of interest as current subsets of points;

reconstructing an image based on current subsets of points, by combining signal data associated to the current subsets of points;

detecting one or more signal features in a last image reconstructed;

for each of the one or more signal features detected, modifying one or more subsets of the current subsets, so as to change a number of points of the one or more subsets, according to a location of said each of one or more signal features detected, whereby new current subsets of points are obtained; and repeating the above steps of reconstructing, detecting and modifying, as necessary to obtain a reconstructed image that satisfies a given condition.

25. A computer program product for recovering an image from signal data, the computer program product comprising a non-transitory, computer readable storage medium having program instructions embodied therewith, the program instructions being executable by a computerized system to cause to:

access signal data representing signals;

identify subsets of points arranged so as to span a region of interest as current subsets of points;

reconstruct an image based on current subsets of points, by combining signal data associated to the current subsets of points;

detect one or more signal features in a last image reconstructed;

for each of the one or more signal features detected, modify one or more subsets of the current subsets, so as to change a number of points of the one or more subsets, according to a location of said each of one or more signal features detected, whereby new current subsets of points can be obtained; and repeat the above steps of reconstructing, detecting and modifying, as necessary to obtain a reconstructed image that satisfies a given condition.

\* \* \* \* \*